United States Patent [19]

Terzian

[11] Patent Number: 4,887,304
[45] Date of Patent: Dec. 12, 1989

[54] LIBRARY IMAGE OPTIMIZATION

[75] Inventor: John Terzian, Winchester, Mass.

[73] Assignee: Raytheon Company, Lexington, Mass.

[21] Appl. No.: 326,436

[22] Filed: Mar. 16, 1989

Related U.S. Application Data

[63] Continuation of Ser. No. 103,099, Sep. 30, 1987, abandoned.

[51] Int. Cl.$^4$ .............................................. G06K 9/64
[52] U.S. Cl. ....................................... 382/30; 382/34; 382/36
[58] Field of Search ....................... 382/30, 34, 36, 33, 382/15

[56] References Cited

U.S. PATENT DOCUMENTS

| | | | |
|---|---|---|---|
| 4,327,354 | 4/1982 | Persoon ................................. | 382/15 |
| 4,503,557 | 3/1985 | Maeda ................................... | 382/36 |
| 4,651,289 | 3/1987 | Maeda at al. .......................... | 382/15 |
| 4,672,678 | 6/1987 | Koezuka et al. ....................... | 382/33 |

OTHER PUBLICATIONS

Author William K. Pratt, "Digital Image Processing," published by John Wiley & Sons, Inc. 1978, pp. 322-326 and 542-545.

Primary Examiner—Leo H. Boudreau
Assistant Examiner—Yon Jung
Attorney, Agent, or Firm—Edmund J. Walsh; Richard M. Sharkansky

[57] ABSTRACT

A process is disclosed for forming reference images useful in object identification processes where an image of an unknown object is compared to each image in a library of reference images. The disclosed process forms the reference image by combining a plurality of images of objects of the same class.

5 Claims, 4 Drawing Sheets

LIBRARY IMAGE OPTIMIZATION

This application is a continuation of application Ser. No. 103,099 filed Sept. 30, 1987, abandoned.

CROSS-REFERENCE TO RELATED APPLICATIONS

Vertical Verloi Pattern Reorganization Algorithm Ser. No. 102,980, filed Sept. 30, 1987 Irreulier John Terzian.

BACKGROUND OF THE INVENTION

This invention pertains generally to methods for pattern recognition, and more specifically to a method for improving the effectiveness of an object identification algorithm using pattern matching.

In many applications it is useful to have a computer identify a particular object by matching the received image of the object with an image in a library of stored reference images. The effectiveness of any technique for object identification through image matching depends to a large measure on the similarity of a received image of an unidentified object to an image in a library of stored reference images. In real systems, noise, background clutter and other sources of interference militate against having a received image precisely matching any image in a library of stored reference images where the number of stored reference signals is limited. As a matter of fact, in many cases the received image may be so corrupted by noise, clutter or other interfering signals that such an image may not be matched to any reference image in a library of practical size.

SUMMARY OF THE INVENTION

It is a purpose of this invention to provide a method for forming reference images useful in a pattern matching system.

The foregoing and other objects of the invention are achieved by (a) comparing a plurality of additional reference images to each image in a library of reference images where each image in the library represents one class of object; (b) computing a plurality of scores for each additional reference image indicating the similarity between the additional reference image and each image in the library of reference images; (c) forming an accumulated composite image from additional reference images with scores selected because their scores indicate they are not too different than the image of the same class of object as the additional reference image in the library of reference images; and (d) merging the accumulated composite image with the image in the library of the same class as the images used to form the accumulated composite such that a new library image is formed.

BRIEF DESCRIPTION OF THE DRAWINGS

The invention will be more fully understood from the following more detailed description when taken in conjunction with the accompanying drawings in which.

DESCRIPTION OF THE PREFERRED EMBODIMENT

Pattern recognition techniques have numerous applications. For purposes of describing the present invention, the patterns are herein depicted as representing images containing silhouettes of ships. One skilled in the art will recognize that the source of the patterns is illustrative only and the present invention operates regardless of particular types of patterns being recognized.

Figure 1:
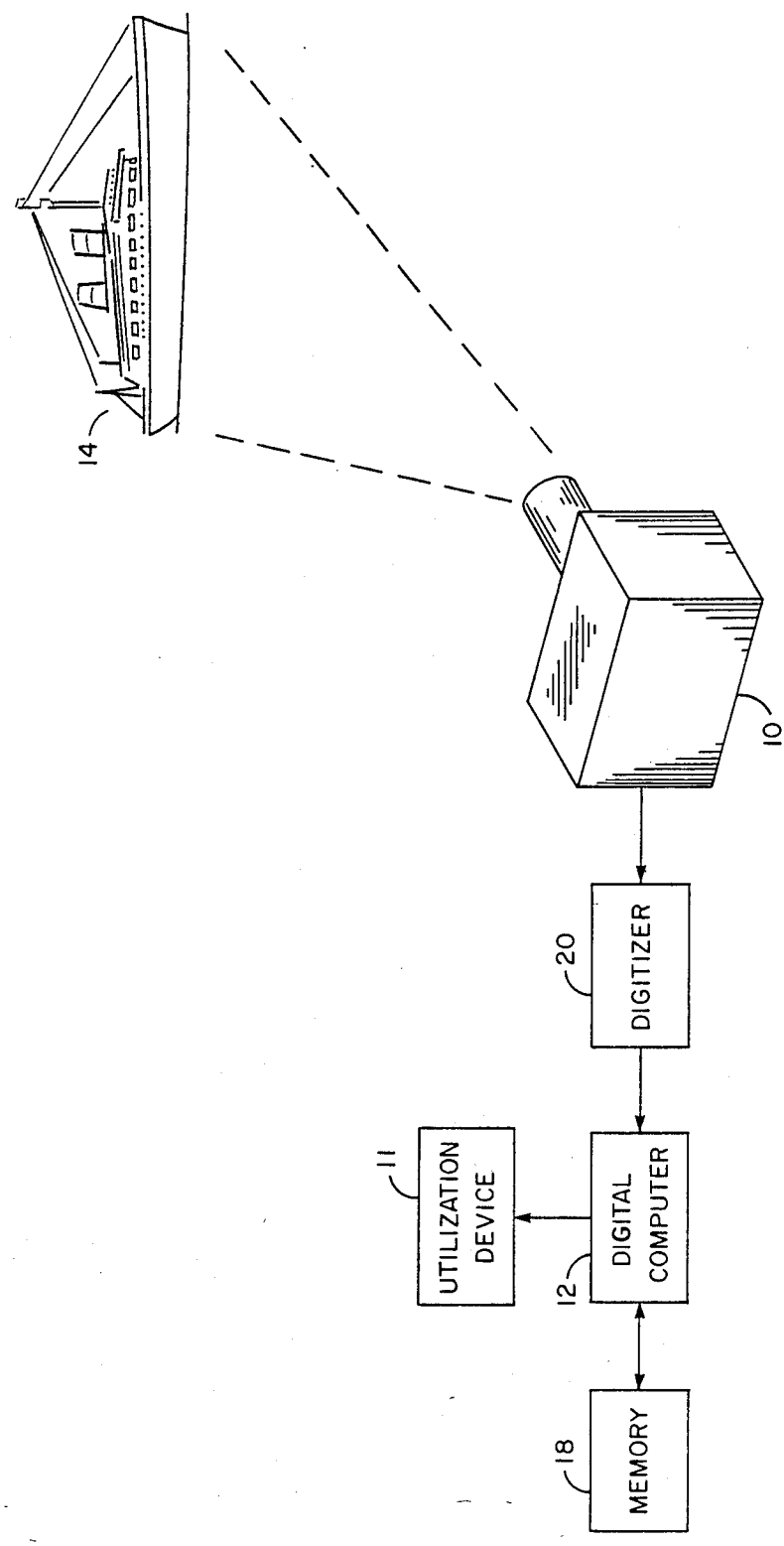
FIG. 1 is a sketch useful in understanding a system in which the invention might be employed.

FIG. 1 shows a system in which an unknown object is recognized by comparison of the received image of the unknown object with the images in a library of reference images. An imaging device 10 is shown focussed on an unknown ship 14. The imaging device 10 may be any known device for forming an image using visible light or infrared radiation. The image of the unknown ship 14 is digitized by a digitizer 20. The digitized image is transferred to digital computer 12 wherein processing is accomplished according to the method shown in FIG. 2 and described below. As part of that processing, the digitized image is compared to silhouettes of known ships stored in memory 18. The results of the comparisons are sent to a utilization device 11 such as a cathode ray tube (CRT), allowing a human operator to read the results. The imaging device 10, the image digitizer 20, the digital computer 12, and memory 18 could be any devices known in the art for obtaining and processing digitized images.

Figure 2:
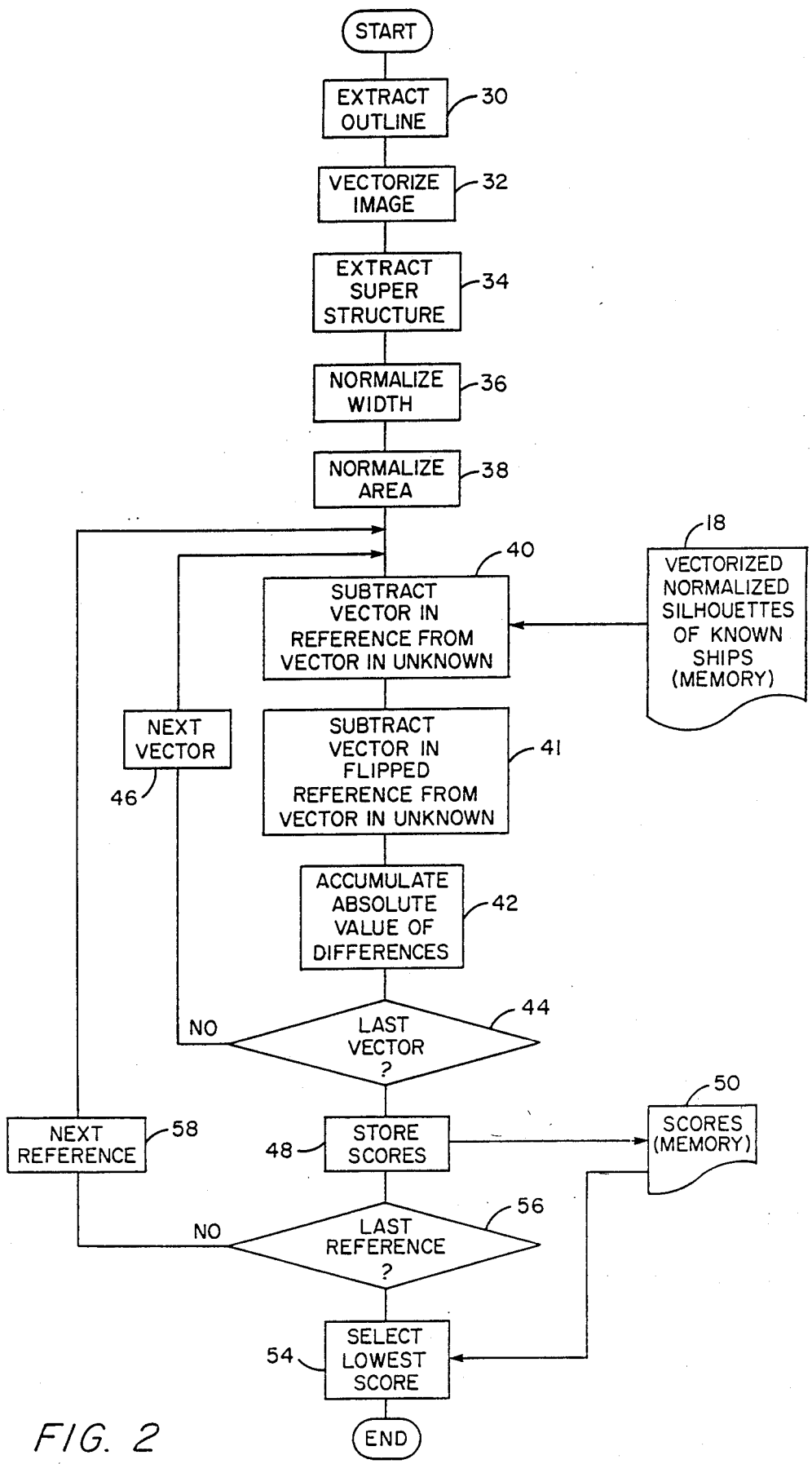
FIG. 2 is a flow chart of an object identification process.

Referring now to FIG. 2, it should be noted that the processing in FIG. 2 here is implemented by programming a general purpose digital computer such as a VAX 11/780 manufactured by Digital Equipment Corporation, Maynard, Mass. The rectangular elements in the flow diagram of FIG. 2, typified by element 30 and hereinafter denoted as "processing blocks," represent a single instruction or group of computer software instructions for the general purpose digital computer 12 (FIG. 1) to execute. The diamond-shaped elements, typified by element 44 and hereinafter denoted "decision blocks," represent groups of computer software instructions which evaluate some condition and effect the order of execution of the processing blocks of the condition. The elements with curved bottoms, typified by memory 18, represent information stored in hardware memory accessible by the general purpose digital computer 12 (FIG. 1). Memory is only shown explicitly where large amounts of information are stored. The usages of memory common to most computer software programs, such as the storage of program variables, are not explicitly shown. It will be noted by one skilled in the art that initialization of variables and loops (and other standard elements of computer software programs) is not explicitly shown.

At processing block 30 the silhouette of the unknown ship's silhouette is extracted according to any known algorithm, or combination of algorithms, such as the ones for edge enhancement described at pages 322 to 326 of *Digital Image Processing* by William K. Pratt, published by John Wiley & Sons, Inc., 1978 and the algorithms for edge segmentation described at pp. 542-545 of the same reference. However, one skilled in the art will recognize that any other algorithms could be used to extract the silhouette of the unknown ship 14 (FIG. 1).

Figure 3:
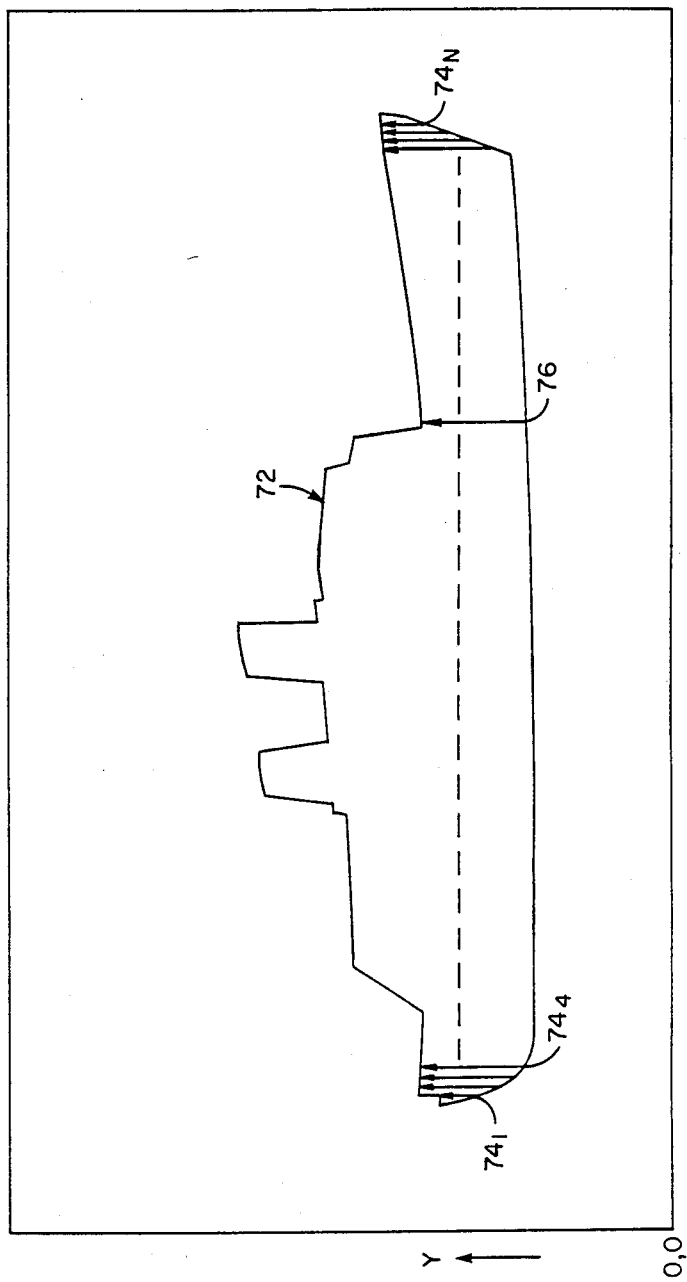
FIG. 3 is a sketch useful in understanding how an image is by vertical vectors.

At processing block 32 the image is vectorized such that the ship's silhouette is described by a set of vertical vectors 74, as shown in FIG. 3. FIG. 3 shows exemplary ones of a set of N vertical vectors 74 which describe the silhouette 72 of the unknown ship 14 (FIG. 1) in a field of view. Each vertical vector 74 is described by a pair of numbers representing an X and a Y value. As can be seen in FIG. 3, the vertical vectors 74 extend from the bottom to the top of the silhouette 72. It should be noted in FIG. 3 that the vertical vectors 74 begin at equidistant intervals in the X direction. Because the vertical vectors 74 are evenly spaced in the X direction, the total number N depends on the extent of the silhouette in the X direction. The height of the vectors, i.e., the lengths of the vertical vectors, depends on the distance between the top and the bottom of the silhouette 72 at each X location.

At processing block 34 in FIG. 2, the vertical vectors 74 (FIG. 3) describing the silhouette of the unknown ship 14 (FIG. 1) are adjusted to represent only variations along the top edge of the silhouette, here the superstructure of the unknown ship. At processing block 34, the minimum midship vector 76 (FIG. 3), hereinafter also denoted VN, is identified as the shortest of all vertical vectors (excluding the few vertical vectors, say four percent, on the left side of the image and the few vertical vectors, say four percent, on the right side of the image). All of the vertical vectors are then adjusted by subtracting the magnitude of VN. Each member of the set of adjusted vectors is hereafter denoted U(X). Alternatively, the processing as done at processing block 34 may be omitted and the normalized vertical vectors used in subsequent processing.

At processing block 36 of FIG. 2, the width of the silhouette is normalized by using n[CINT(N/100)]th vector for N=1 to 100 where CINT is a function rounding the value in parentheses to the nearest integer. The resulting image will always contain, therefore, 100 vertical vectors. At processing block 38 the height of the vectors is normalized such that the silhouette occupies a predetermined area. The normalization is achieved according to the formula $$H(X) = U(X)/(MSV/8)$$

where
H(X) is the normalized height of vector X,
U(X) is the unnormalized, adjusted height of vector X, and
MSV is the average of the set of adjusted vectors.

At processing blocks 40, 41, and 42, the normalized image of the unknown ship's silhouette is compared to stored silhouettes of known ships. The silhouettes of the known ships are stored before operation in memory 18 in a vectorized, normalized form corresponding to the form of the silhouette to be recognized after passing through processing blocks 30, 32, 34, 36 and 38. Memory 18 contains images for every class of ship the processing can identify. In addition, the memory 18 preferably contains several images for each class, representing the ship viewed from several, here four, different aspects. At processing block 40 one vector of the reference image, i.e., the known silhouette of a particular class of ships, is subtracted from the corresponding vector of the received normalized and vectorized silhouette. Because the bow of the unknown ship might be at either side of the image, a second difference is computed at processing block 41. At processing block 41, the difference is computed by selecting a reference vector as if the reference image had been formed by a ship headed in the opposite direction, i.e., when the first reference vector is used at processing block 40, the last is used at processing block 41; when the second is used at processing block 40, the second to last is used at processing block 41; and so on. At processing block 42 the absolute values of the differences computed at processing blocks 40 and 41 are accumulated. Decision block 44 causes processing blocks 40, 41, and 42 to be repeated for the next vector in the silhouette of the unknown ship, as determined at processing block 46, until each vector in the received vectorized and normalized silhouette has been subtracted from the corresponding vector in the reference image then being taken out of the memory 18. The resulting summations of the absolute values of the differences are denoted as the "scores" of the reference image, one for the unknown compared to the reference and the other for the unknown compared to the reference in reverse. At processing block 48 the scores for the reference ship computed at processing blocks 40, 41 and 42 are stored in memory 50. One skilled in the art will recognize that processing block 48 might alternatively process the scores in some way, such as only storing the lowest scores, to reduce the amount of information stored in memory 50. The comparison process is repeated until the silhouette of the unknown ship is compared to each reference image stored in memory 18 as controlled by the loopback path containing processing block 58.

After the silhouette of the unknown ship is compared to all the reference images stored in memory 18, the reference image with the lowest score is selected at processing block 54. The reference ship corresponding to the lowest score "matches" the unknown ship. The processing thus recognizes the unknown ship as belonging to the same class as the selected reference ship. Alternatively, a thresholding function might be employed such that no classification would be assigned to the unknown ship unless the lowest score obtained for all reference silhouettes is lower than some predetermined value.

Figure 4:
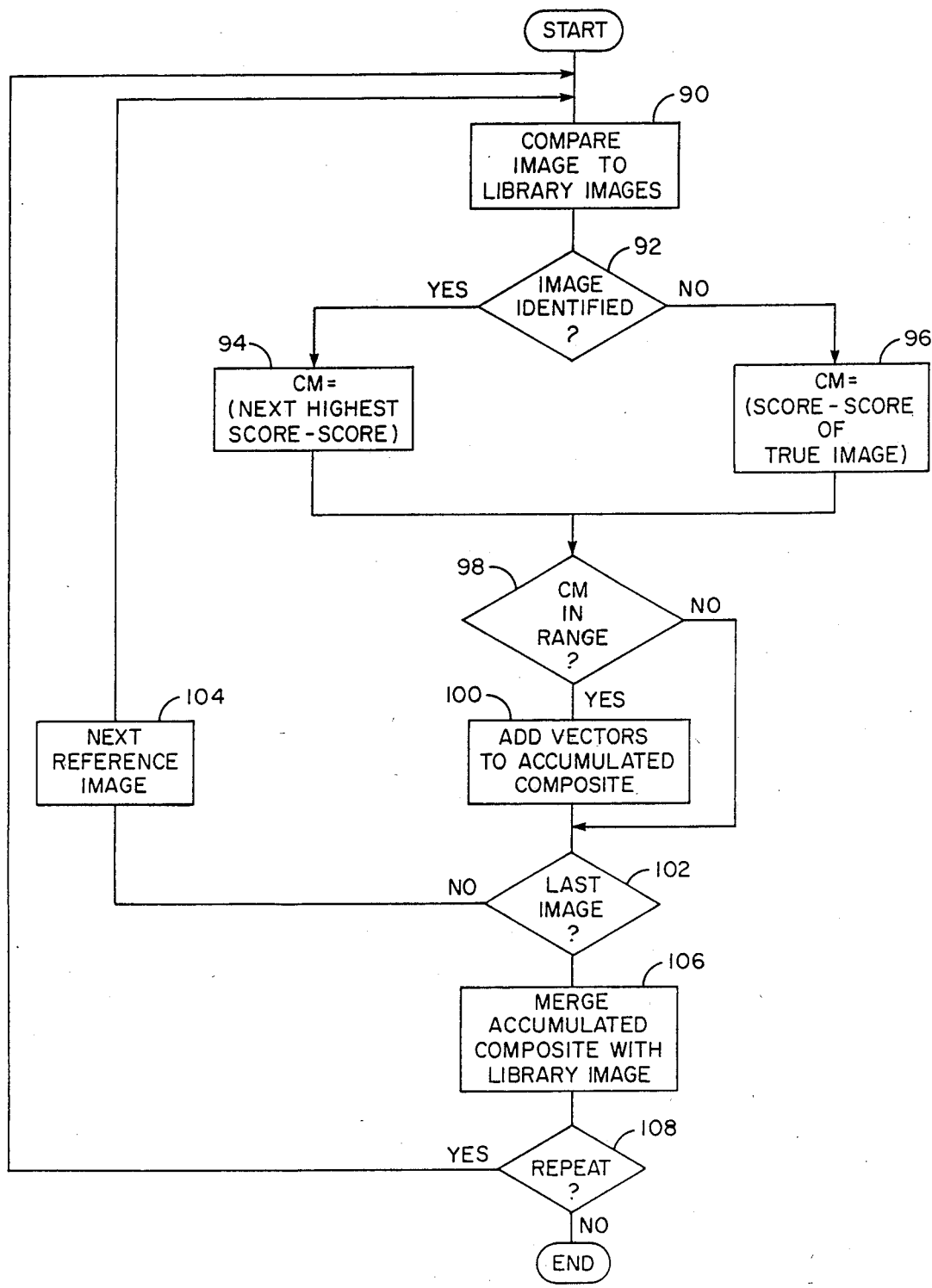
FIG. 4 is a flow chart of the contemplated library image optimization process.

FIG. 1, FIG. 2 and FIG. 3 illustrate the operation of a ship classification system which operates by matching the silhouette of an unidentified ship to one image in a library of images of known ships. FIG. 4 shows an enhancement to that system such that a reference image in the library stored in memory 18 (FIG. 2) represents a composite image formed by combining images of several ships in each class. Such an enhancement could be applied to any image identification system in which an image of an unknown object is identified through comparisons to known images in a library. The system depicted in FIG. 1, FIG. 2 and FIG. 3 is thus illustrative of the class of systems in which this enhancement might be beneficially employed. It should be noted that the steps in FIG. 4 can be performed on the same computer as those in FIG. 2, but the process in FIG. 4 is performed once prior to the identification of unknown ships using the process shown in FIG. 2.

At the start of the process, the library of images in memory 18 (FIG. 2) contains one vectorized, normalized image of a ship in each class to be recognized. As described above, vectorized and normalized images are formed by subjecting images to the processing described in connection with processing blocks 30, 32, 34, 36 and 38 (FIG. 2). Additional vectorized, normalized reference images of a plurality of ships in each of those classes are available for processing.

At processing block 90, as shown in FIG. 4, one of the additional vectorized, normalized reference images is processed according to the method of FIG. 2 to determine the class of the library image which that reference image most nearly matches. At decision block 92, the classification of the image reported by the method of FIG. 2 is compared to the true classification of the object in the additional reference image known a priori. If, as determined at decision block 92, the image has been classified correctly (i.e., the classification computed at processing block 92 is identical to the true classification of the object in the additional reference image), correlation margin (CM) is computed at processing block 94 and equals the difference between the score computed at processing blocks 40, 41, 42 and 44 (FIG. 2) for the library image most nearly matching the reference image and the next lowest score computed for all of the other library images. If the image has been classified incorrectly, as determined at decision block 92, the correlation margin is computed at processing block 96 and equals the difference between the lowest score computed at processing blocks 40, 41, and 42 (FIG. 2) and the score computed for the image in the library of the same class of object as the additional reference image.

At decision block 98 the correlation margin computed at either processing block 94 or 96 is compared to a predetermined range, say −20 to +15. If the correlation margin is within the range, the vectors of the additional reference image are added to a composite image for that class of ship at processing block 100. The composite image consists of the sum of the vectors of the images, i.e. the first vectors of every image making up the composite are added to form the first vector of the composite, the second vectors of every image making up the composite are added to form the second vector in the composite, and so on for each vector in the images. Processing block 100 also maintains a count of the number of images added to the accumulated composite image.

The process of updating the composite images is repeated for each reference image through the loopback path containing decision block 102 and processing block 104. When, as determined by decision block 102, all the additional reference images for a particular class of ships have been processed, the accumulated composite image is merged with the image in the library for that class of ships at processing block 106. Each vector of the merged image is computed according to the formula $$CL = (L + T\ AC/N)/(1 + T)$$

where
CL is the value of the vector in the new library image;
L is the value of the corresponding vector in the old library image;
T is a constant, say 0.1, called the "merge ratio";
AC is the value of the corresponding vector in the accumulated composite image computed at processing block 100; and
N is the number of images added at processing block 100 to form the accumulated composite image.

Once a new library image is formed, the entire process may be repeated because additional reference images may be used further to refine the extant library image in the way just described. Decision block 108 determines if another iteration should be performed. Decision block 108 may stop the iterative process after a predetermined number of iterations have been performed. Alternatively, decision block 108 may stop the iterative process after a predetermined period of time or when the difference between the successively formed library image and the new library image computed at processing block 106 is less than some predetermined value.

The method in FIG. 4 is performed for each reference image in the library of images. Upon completion of the processing, composite images for each class of image to be identified by the processing shown in FIG. 2 are stored in memory 18 (FIG. 2). The composite reference images are thus used when the processing in FIG. 2 is used in a system, such as the one depicted in FIG. 1, to identify an unknown ship 14.

It should be understood by those skilled in the art that various modifications may be made in the present invention without departing from the spirit and scope thereof as described in the specification and defined in the appended claims.

What is claimed is:

1. In a process for identifying an unknown object by comparing a received image of the unknown object with each one of a plurality of reference images in a library of reference images, each reference image in the library being representative of an object of known classification, a method for forming each reference image in the library comprising the steps of:
    (a) forming an initial library containing a plurality of reference images, each such reference image being the image of an object of an identifiable class of objects, and each such image being represented by a plurality of vertical vectors;
    (b) generating a set of additional reference images, each of the reference images in the set being a different image of objects of the same class, and each such image being represented by a plurality of vertical vectors, the vectors in each such image being ordered such that each vector in each image corresponds to one vector in each of the other additional reference images; and
    (c) computing a plurality of scores for each image in a set of additional reference images, each score representing the degree of similarity between the additional reference image and a different one of the reference images in the initial library and all images in the set of additional reference images being formed from objects in one class which the process for identifying an object can identify;
    (d) forming a correlation margin for each image in the set of additional reference images, such correlation margin indicative of the degree to which the additional reference image differs from the reference in the initial library;
    (e) forming an accumulated composite image by adding corresponding vertical vectors in all of the additional reference images with correlation margins in a range of values; and
    (f) forming a new library image by combining the accumulated composite image with the reference image in the initial library of the object of the same class as the objects used to form the additional reference images.

2. The process for forming a reference image as in claim 1 additionally comprising the steps of:
    (a) replacing the reference image in the initial library of the object of the same class as the objects used to form the additional reference images with the new library image; and
    (b) repeating steps (a) through (f) of claim 1.

3. A process of forming a library of reference images wherein the process of claim 1 is repeated a plurality of times, each repetition done with a set of additional reference images of a different class of objects.

4. The process for forming a reference image as in claim 1 wherein the scores rank from lowest to highest in order of degree of similarity between the additional reference image and the reference image in the initial library, and (a) when the lowest score is computed for the reference image in the initial library of the object of the same class as the object used to form the additional reference image, the correlation margin computed for each additional reference image equals the difference between the second lowest score for the additional reference image and the lowest score for that additional reference image; and (b) when the lowest score is not computed for the reference image in the initial library of the object of the same class as the object used to form the additional reference image, the correlation margin computed for each additional reference image equals the difference between the lowest score for that additional reference image and the score for that additional reference image computed for the reference image in the initial library of the object of the same class as the object used to form the additional reference image.

5. The process for forming a reference image as in claim 12 wherein the accumulated composite image and a reference image in the initial library are combined to form a new library image by combining each vector in the accumulated composite image with the corresponding vector in the reference image in the initial library to form the corresponding vector in the new library image according to the formula $$CL = (L + T\, AC/N)/(1+T)$$

where
- $CL$ is the value of the vector in the new library image;
- $L$ is the value of the corresponding vector in the image in the initial library;
- $T$ is a predetermined constant merge ratio;
- $AC$ is the value of the corresponding vector in the accumulated composite image; and
- $N$ is the number of additional reference images with correlation margins in a predetermined range such that they were combined to form the accumulated composite image.

* * * * *